United States Patent
Mason et al.

(10) Patent No.: US 11,329,448 B2
(45) Date of Patent: May 10, 2022

(54) LASER AMPLIFIER MODULE

(71) Applicant: United Kingdom Research and Innovation, Swindon (GB)

(72) Inventors: Paul Mason, Didcot (GB); Mariastefania De Vido, Didcot (GB)

(73) Assignee: UNITED KINGDOM RESEARCH AND INNOVATION, Swindon (GB)

( * ) Notice: Subject to any disclaimer, the term of this patent is extended or adjusted under 35 U.S.C. 154(b) by 199 days.

(21) Appl. No.: 16/616,094

(22) PCT Filed: May 23, 2018

(86) PCT No.: PCT/GB2018/051405
§ 371 (c)(1),
(2) Date: Nov. 22, 2019

(87) PCT Pub. No.: WO2018/215771
PCT Pub. Date: Nov. 29, 2018

(65) Prior Publication Data
US 2020/0153194 A1 May 14, 2020

(30) Foreign Application Priority Data
May 24, 2017 (GB) .................................... 1708315

(51) Int. Cl.
*H01S 3/00* (2006.01)
*H01S 3/23* (2006.01)
(Continued)

(52) U.S. Cl.
CPC .......... *H01S 3/2325* (2013.01); *H01S 3/0404* (2013.01); *H01S 3/0604* (2013.01);
(Continued)

(58) Field of Classification Search
None
See application file for complete search history.

(56) References Cited

U.S. PATENT DOCUMENTS 3,628,179 A * 12/1971 Cuff .......................... H01S 3/07
372/35
5,272,713 A 12/1993 Sobey et al.
(Continued)

FOREIGN PATENT DOCUMENTS

CN 101071930 A 11/2007
CN 101752779 A * 6/2010 ............... H01S 3/06
(Continued)

OTHER PUBLICATIONS

Chinese Application No. 201880049841.8, Office Action dated Mar. 5, 2021, 22 pages.
(Continued)

*Primary Examiner* — Mark Hellner
(74) *Attorney, Agent, or Firm* — Lathrop GPM LLP; Gordon R. Moriarty

(57) ABSTRACT

A fluid-cooled laser amplifier module (100) is disclosed which comprises: a casing; a plurality of slabs (110) of optical gain medium oriented in parallel in the casing for cooling by a fluid stream (154, 156); a polarisation rotator (120) disposed between a first group of one or more slabs (111) of the optical gain medium and a second group of one or more slabs (112) of the optical gain medium; optical windows (150, 152) for receiving an input beam or pulse (130) for amplifying by the slabs and for outputting the amplified beam or pulse (140); and fluid stream ports (155, 157) for receiving and discharging the fluid stream for cooling the slabs.

28 Claims, 9 Drawing Sheets

(51) Int. Cl.
    *H01S 3/04*     (2006.01)
    *H01S 3/06*     (2006.01)
    *H01S 3/08*     (2006.01)
    *H01S 3/094*     (2006.01)

(52) U.S. Cl.
    CPC ........ *H01S 3/0606* (2013.01); *H01S 3/08072* (2013.01); *H01S 3/094096* (2013.01)

(56) References Cited

U.S. PATENT DOCUMENTS

| | | | |
|---|---|---|---|
| 5,892,789 | A | 4/1999 | Yasui et al. |
| 8,514,475 | B2 | 8/2013 | Deri et al. |
| 2001/0015993 | A1 | 8/2001 | Wada et al. |
| 2003/0053508 | A1 | 3/2003 | Dane et al. |
| 2005/0249258 | A1 | 11/2005 | Rothenberg et al. |
| 2012/0105931 | A1* | 5/2012 | Deri ............... G02F 1/0311 359/257 |
| 2012/0105948 | A1 | 5/2012 | Bayramian et al. |
| 2014/0368901 | A1 | 12/2014 | Erlandson |

FOREIGN PATENT DOCUMENTS

| | | |
|---|---|---|
| CN | 102545009 A | 7/2012 |
| CN | 102870293 A | 1/2013 |
| CN | 105470789 A | 4/2016 |
| CN | 105870772 A | 8/2016 |
| EP | 2553778 B1 | 12/2015 |
| GB | 2497947 A | 7/2013 |
| WO | WO2013144678 A1 * | 10/2013 ............... H01S 3/00 |

OTHER PUBLICATIONS

Mason, DiPOLE100:A 100J,10 hz DPSSL Using Cryogenic Gas Cooled Yb: YAG Multi Slab Amplifier Technology, Proceedings of SPIE,9513, 951302-1, dated May 12, 2015.
Kochetkova, Propagation of Laser Radiation in a Medium with Thermally Induced Birefringence and Cubic Nonlinearity, Optics Express, 12839-12851, dated Jun. 1, 2010.
"Study of key technologies of high-power solid-state Slab Amplifiers", Beijing Jiaotong University.
Chinese Application No. 201880049841.8, Notice of Registration, dated Sep. 18, 2021, 10 pages.
Clarkson et al., "Simple method for reducing the depolarization loss resulting from thermally induced birefringence in solid-state lasers", Optics Letters, vol. 24, No. 12, Jun. 15, 1999.
International Search Report and Written Opinion in related PCT Application No. PCT/GB2018/051405, dated Aug. 22, 2018 (13 pages).
Li et al., "Edge-pumped multi-slab amplifier for inertial fusion energy (IFE)", Proceedings of SPIE, vol. 10016, Nov. 9, 2016, pp. 100160F-1-100160F-10.
Mason et al., "Optimised design for a 1 kJ diode-pumped solid-state laser system", Proceedings of SPIE, vol. 8080, May 5, 2011, pp. 80801X-1-80801X-9.
Search Report in related Application No. GB1708315.5 dated Nov. 15, 2017 (1 page).
EP Application No. 18 728 710.7, Allowance Communication, dated Feb. 8, 2022, 5 pages.

* cited by examiner

LASER AMPLIFIER MODULE

This application is a national phase entry under 35 U.S.C. § 371 of PCT/GB2018/051405 filed on May 23, 2018, which claims priority to GB Application No. 1708315.5 filed on May 24, 2017. The contents of each of the aforementioned patent applications are hereby incorporated by reference in their entirety.

TECHNICAL FIELD

The present invention relates to a laser amplifier module with depolarisation compensation. For example, embodiments provide a laser amplifier module and method in which the laser amplifier includes self-compensation.

BACKGROUND

Lasers with high output power are required for a number of applications such as materials processing, investigation of material properties, laser induced fusion for energy production, particle acceleration and military applications. Lasers for these applications are required to provide high energy, high repetition rate pulses. One of the challenges associated with obtaining stable and reliable high energy pulse generation at high pulse rate is the heating of optical elements, especially within amplifier modules. Often to achieve high energy, large aperture laser beams are amplified up to their high energies by multiple passes through an amplifier or passes through multiple amplifier modules. Compact designs tend to use multiple passes through a single amplifier module, whereas other designs can use multiple amplifier modules cascaded together. Whichever design is used each amplifier module may contain multiple slabs of optical gain medium which are cooled by a fluid stream such as a gas stream. The gain slabs are optically pumped to produce the laser amplification. It is usually desirable that the laser beam is linearly polarised and components within the laser, or components or devices after the laser, rely on the beam being linearly polarised. Of course, linear polarisation can be achieved by use of a suitably aligned polariser assuming it is capable of handling the beam power.

In these high power, large aperture lasers the gain medium may be mounted in vane plates. These vane plates are designed to hold the gain slabs in the cooling stream while minimising mechanical stress to the gain material and to avoid distortion in the gain slabs. Vane plates for mounting gain slabs are described in a UK patent application published as GB 2497947 A1 by the applicant of the current application. The arrangement described therein is shown in cross-section in FIG. 1 with vane plates 60 mounted in a manifold 80. In each vane plate 60 there is mounted a gain slab 62 within an aperture of the vane plate. Between the vane plates there are small gaps or channels 86 through which the cooling stream such as a cooling gas flows to cool the gain slabs and vane plates. The manifold mounts the vane plates and contains the gas flow. The manifold 80 includes windows 82 through which the optical pump beam (for example, pump laser beam or flashlamp) and seed laser beam are directed at the gain slabs. In other arrangements the optical pump beam and seed laser beam may be arranged to be separately incident on the gain slabs. For example, the optical pump beam may side pump the gains slabs and in that case would be directed normal to the plane of the page in FIG. 1. The gain slabs 62 may be Yb:YAG or other materials. A number of such materials are optically isotropic if unstressed. However, the thermal load on the slabs can induce stress in the gain material. The thermally-induced stress results in birefringence occurring in the material. The birefringence is as a result of a modification of the material's elasto-optic effect. Other materials (such as titanium:sapphire) may be anisotropic and the material's birefringence changes under the thermally-induced stress. The actual birefringence will vary across the area of the gain slab due to a number of effects such as i) differences in thermal load across the gain slab; ii) non-uniformity across the slab due to material manufacturing and processing; and iii) differences in residual mounting stress.

Accordingly, the varied birefringence across the slab will cause a single linear input polarisation to the gain slab to result in an output beam having variation in polarisation across the slab area. For example, this is shown schematically in FIG. 2. FIG. 2a shows schematically the polarisation across the input beam as being uniform and vertically polarised. The birefringence induced in the gain slabs causes some of the linearly polarised light to be converted to elliptically or circularly polarised light, which may be left or right handed elliptically or circularly polarised, as shown in FIG. 2b. As can be seen in the figure the polarisation state does not vary linearly across the slabs but can include areas or pockets where the polarisation state has been changed by similar or different amounts. Although a single linear polarisation across the beam can be recovered by using a polariser at the output this will result in reduced intensity for those parts of the laser beam where the polarisation is out of alignment with the polariser. Hence, for an input beam having uniform intensity across the beam the intensity of the output beam will vary across the beam and the transmitted energy through the polariser will be reduced.

A technique for reducing depolarisation loss is described in "Simple method for reducing the depolarization loss resulting from thermally induced birefringence in solid-state lasers", W. A. Clarkson et al., Optics Letters, Volume 24, No. 12, 15 Jun. 1999. The technique uses a single quarter-wave plate to reduce depolarisation loss in a rod laser.

SUMMARY OF THE INVENTION

The present invention provides a fluid-cooled laser amplifier module, comprising: a casing or manifold; a plurality of slabs of optical gain medium oriented, preferably, in parallel in the casing or manifold for cooling by a fluid stream; a polarisation rotator disposed between a first group of one or more slabs of the optical gain medium and a second group of one or more slabs of the optical gain medium. An input optical window may be provided for receiving an input beam or pulse for amplifying by the slabs. An output optical window may be provided for outputting the amplified beam or pulse. The casing or manifold may comprise fluid stream entry and exit ports for receiving and discharging the fluid stream for cooling the slabs. The fluid stream ports may be arranged parallel to the plane of the slabs such that the fluid stream is oriented to flow between the slabs. The fluid may be a gas or liquid, but is preferably a gas such as helium. The polarisation rotator may be arranged between the first group of slabs and the second group of slabs such that birefringence of the first group of slabs is compensated for by the birefringence of the second group of slabs. That is, depolarisation resulting from the first group of slabs is compensated for by the second group of slabs. The polarization rotator is preferably arranged to transpose orthogonal polarisation components of an input beam or pulse that have passed through the first groups of slabs. The transposition is preferably such that the relative retardance between the orthogonal polarisations after passing through the first group of slabs is substantially removed by passing through the second group of slabs. In other words the effect of the birefringence of the second group of slabs is opposite to the effect of the first group of slabs. That is the relative phase delays of orthogonal polarisations are swapped. The relative phase lag between first and second polarisation states is reversed between the first group of slabs and the second group of slabs.

The polarisation rotator may be arranged to rotate the plane of polarisation of the input beam or pulse that has passed through the first group of slabs such that the relative retardance between the orthogonal polarisations after passing through the first group of slabs is equal and opposite to the relative retardance between the orthogonal polarisations after passing through the second group of slabs. In other words, the relative retardance caused by the first group of slabs is reversed by the second group of slabs. By relative retardance we mean the relative phase delay.

A pulse or beam input to the laser amplifier module is preferably linearly polarised. Birefringence in the gain slabs may be considered by reference to principal axes which define the different velocities of the pulses with orthogonal polarisations. With the principal axes of birefringence in mind the beam or pulse may be considered to comprise orthogonal polarisation components. After passing through a first group of one or more gain slabs one of the orthogonal components will have a phase lag or retardance compared to the other component due to the birefringence. The polarisation rotator preferably rotates the polarisation of the beam or pulses exiting from the first group of slabs by substantially 90°. That is it transposes the orthogonal components. The second group of one or more gain slabs is configured to preferably provide equal birefringence as the first group. Accordingly, the polarisation component that was lagging after the first group of gain slabs experience less phase delay than the other component. The relative phase lag or retardance through the second group of slabs is equal in quantity but occurs on orthogonal polarisation components as compared to the first components. Overall through the two groups of gain slabs the phase lag is equal and therefore substantially eliminates depolarisation effects.

The laser amplifier module described herein uses a polarisation rotator inside the amplifier head. Some prior art techniques apply a polarisation rotator between multiple amplifier modules. The module described herein is suitable for laser designs with a single amplifier module, whereas prior designs are not. The module described herein may be considered to be self-compensating.

The gain slabs and polarisation rotator are preferably mounted in the same module and cooled by the same cooling system, which may be cryogenic. This means adverse effects associated with a thermal load on the polarisation rotator are removed.

In a preferred arrangement all gain slabs experience the same thermal load. If the polarisation rotator plate is placed in the middle of the amplifier (between equal groups of slabs) a high degree of depolarisation compensation is achieved.

Furthermore, if the polarisation rotator is placed in the middle of the amplifier module, then depolarisation effects can be substantially compensated even if there is lateral misalignment or shear (angular) misalignment at the module on different passes through the amplifier. To put it another way, if the polarisation rotator is placed in the amplifier module, the depolarisation compensation scheme is much more tolerant to misalignment than if the polarisation rotator is outside of the amplifier module.

Additionally, if the polarisation rotator is placed in the middle of the amplifier module, then the self-compensating effect reduces losses in the laser system. For example, optical coating performance depends on the polarisation state of the beam and may be tailored depending on the polarisation state. Higher design flexibility is also achieved because the need to carefully consider where to place polarisation sensitive optics and devices is reduced. Moreover, any polarisation sensitive beam diagnostic channel is unaffected by thermal depolarisation because this is substantially eliminated.

A further advantage is that the effect of birefringence occurring in windows of the module may also be substantially reduced. For example, if the input and output windows experience substantially the same thermal stress and are made of the same material, the arrangement will reduce the effect of the birefringence of the windows. Stresses in the windows caused by other aspects, such as manufacturing stresses, may also be reduced.

The techniques disclosed herein are directed to reducing or eliminating thermally-induced stress-birefringence effects in gain slabs and windows, However, the present invention has also been shown to provide a reduction in non-thermally induced stress-birefringence effects. Non-thermal effects may provide different birefringent effects in the slabs on one side of the rotator (first group of slabs) as compared with those on the other side of the rotator (second group of slabs). This may reduce the effectiveness of self-compensation after a single pass through the amplifier module. However, effects can be reduced on subsequent passes through the same amplifier module, even though not as completely as for the thermally-induced component. The same reduction can be seen for the non-thermally-induced stress in the windows.

The polarisation rotator preferably provides a 90 degree rotation in the polarisation of the input beam or pulse.

The polarisation rotator may comprise one or more polarisation rotation components, the combined polarisation rotation of the polarisation rotation components being substantially 90 degrees, such as between 87 and 93 degrees or more preferably between 89 and 91 degrees. For example, two polarisation rotator components providing around 45 degrees of rotation each could be provided in series. In one embodiment where the thickness of a 90 degree rotator is, for example, two times the thickness of a gain slab then cutting the rotator in two may make the design of the coolant flow in the amplifier module more uniform across all components.

The polarisation rotator may comprise a material having optical activity or circular birefringence to produce the polarisation rotation. The polarisation rotator may be crystalline quartz.

The polarisation rotator may be a Faraday rotator.

The laser amplifier module may further comprise a manifold, wherein the polarisation rotator may be mounted for cooling by the same fluid stream as the slabs.

The laser amplifier module may further comprise an input optical window for receiving an input beam for amplifying by the slabs and an output optical window for outputting the amplified input beam.

Each of the slabs of optical gain medium may be mounted in a corresponding vane plate arranged for cooling by the fluid stream, and the polarisation rotator may be mounted in a further vane plate for cooling by the fluid stream.

The first group of slabs and second group of slabs may be such that the first and second groups of gain slabs have equal birefringence. The first group of slabs and second group of slabs may comprise the same gain material and the same number of slabs. The first group of slabs and second group of slabs may comprise the same gain material and the same total thickness of gain material. The first group of slabs and second group of slabs may comprise the same gain material and the same amount of gain or same heating of the gain slabs.

The polarisation rotator may be placed in the middle of the gain slabs such that there are equal numbers of gain slabs in the module in the optical path before and after the polarisation rotator. That is there may be an even number of slabs in total.

The present invention further comprises a laser comprising the laser amplifier module of any preceding claim. The laser may further comprise a seed oscillator for generating seed laser pulses; and optical components to couple the seed pulses to the laser amplifier module.

The laser may further comprise one or more pre-amplifiers for amplifying the seed pulses before transmission to the laser amplifier module.

The laser may comprise further optical components to direct the pulses for multiple passes through the laser amplifier module.

The laser may comprise a plurality of said laser amplifier modules and further optical components to direct the pulses from one amplifier module to the next.

The present invention provides a method of depolarisation compensation in a laser amplifier module, comprising: arranging a polarisation rotator in an optical path between a first group of one or more slabs of optical gain medium and a second group of slabs of optical gain medium; directing an input pulse or beam at the first group of slabs and to subsequently pass through the polarisation rotator and second group of slabs. The polarisation rotator may rotate the polarisation of the input beam or pulse that has passed through the first group of slabs to transpose orthogonal polarisation components of the input beam or pulse, the transposition such that relative retardance between the orthogonal polarisations is substantially removed by passing through the second group of slabs.

The present invention provides a laser amplifier module, comprising: a first group of one or more slabs of optical gain medium, the slabs mounted in one or more first mounting vanes; a polarisation rotator; and a second group of one or more slabs of optical gain medium, the slabs mounted in one or more second mounting vanes, wherein the polarisation rotator is arranged between the first group of slabs and the second group of slabs and the polarisation rotator transposes orthogonal components of an input beam or pulse.

The present invention also provides a laser amplifier module comprising a plurality of slabs of optical gain medium, the laser amplifier module, comprising: a first group of one or more slabs of optical gain medium; a polarisation rotator; and a second group of one or more slabs of optical gain medium, wherein the polarisation rotator is arranged in the optical path between the first group of slabs and the second group of slab such that the second group of slabs compensates for depolarisation resulting from the first group of slabs.

BRIEF DESCRIPTION OF THE DRAWINGS

Embodiments of the present invention, along with aspects of the prior art, will now be described with reference to the accompanying drawings, of which.

DETAILED DESCRIPTION

Figure 3:
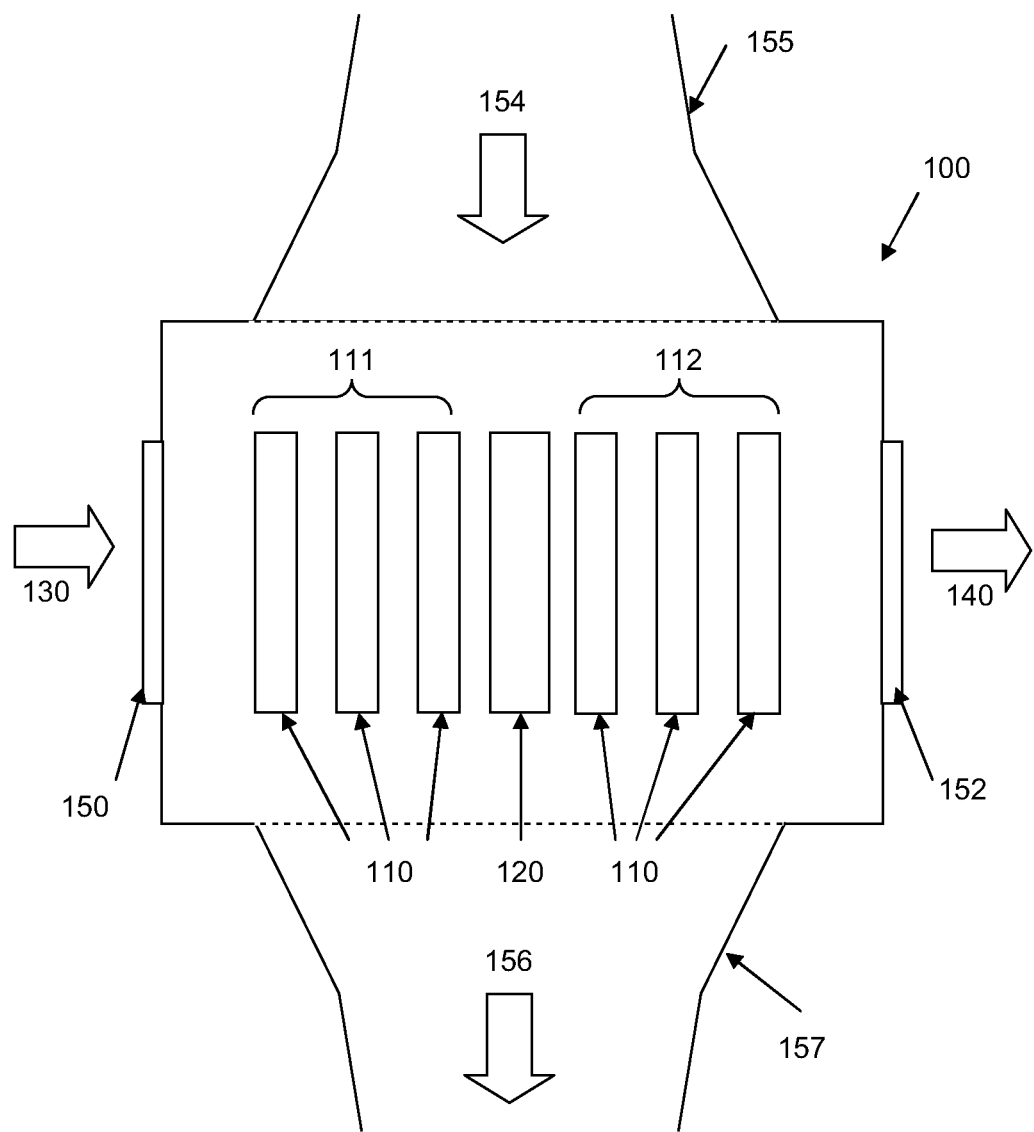
FIG. 3 is a schematic diagram of an amplifier module according to the present invention.

FIG. 3 shows schematically an arrangement of slabs 110 of gain material in a laser amplifier module 100. The laser amplifier module comprises a plurality of slabs, which in the example of FIG. 3 comprises six slabs of amplifier material. The amplifier slabs are grouped into two groups with a polarisation rotator 120 arranged between them. The first group of slabs 111 comprises three slabs of gain material. The second group of slabs 112 also comprises three slabs of gain material. The slabs in each group are spaced to allow a fluid stream such as a gas stream to flow between them and cool them. The polarisation rotator 120 is also spaced apart from the gain slabs to allow the slabs and polarisation rotator to be cooled by the fluid stream. The pump beam and laser pulses are incident on the gains slabs after passing through optical window 150. A further optical window 152 is provided at the output side of the amplifier module. A casing or manifold, along with the windows 150 and 152 close the amplifier module such that the cooling stream is contained. This configuration is known as end-pumping. Alternative pumping configurations are possible, for example edge-pumping. The embodiments and methods described herein are applicable to these configurations.

Figure 1:
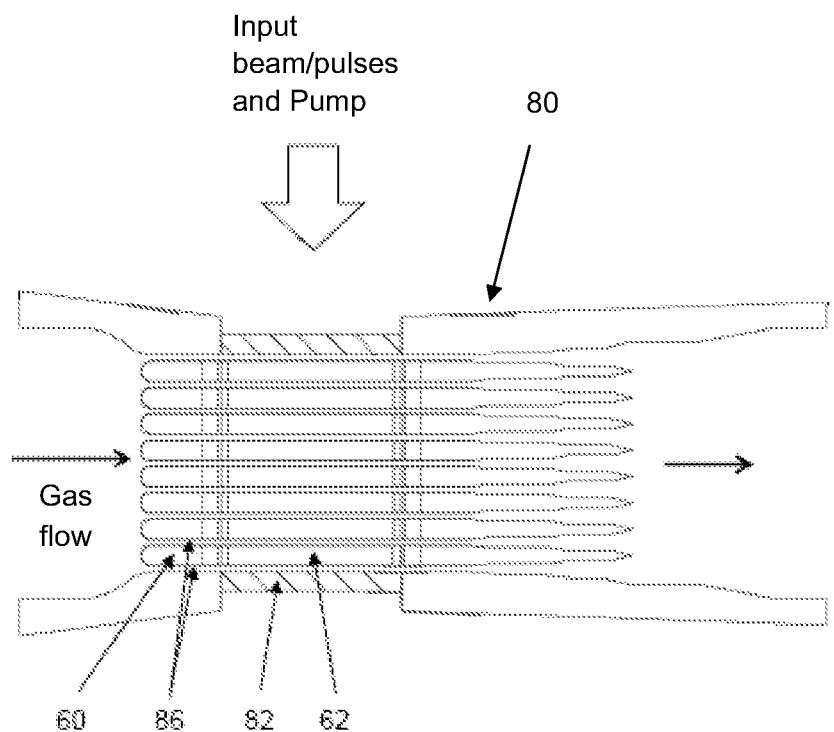
FIG. 1 is a cross-sectional view through a manifold with multiple vane plates mounted therein, according to the prior art.

The laser amplified module is cooled by a fluid stream. The stream is a gas or liquid but preferably a gas. The module comprises a fluid or gas entry port 155 through which the cooling stream 154 is delivered to the module and cools the slabs. The module also comprises a fluid or gas exit port 157 through which the cooling stream 156 is discharged. The discharged cooling stream may be cooled again and recycled to return to provide further cooling. The slabs are preferably arranged parallel to each other with small gaps or channels between them. The polarisation rotator is similarly arranged. The fluid/gas entry and exits ports are preferably parallel to the plane of the slabs such that the fluid/gas arriving at the module is directed between the slabs, and also between the rotator and slabs. Although the ports 155 and 157 in FIG. 3 are shown as having an increasing diameter closer to the module, in practice the arrangement may not be like this. For example, as shown in FIG. 1 it is more likely that this is different, with the ports having a largely constant diameter or slightly decreasing diameter close to the module.

Figure 2:
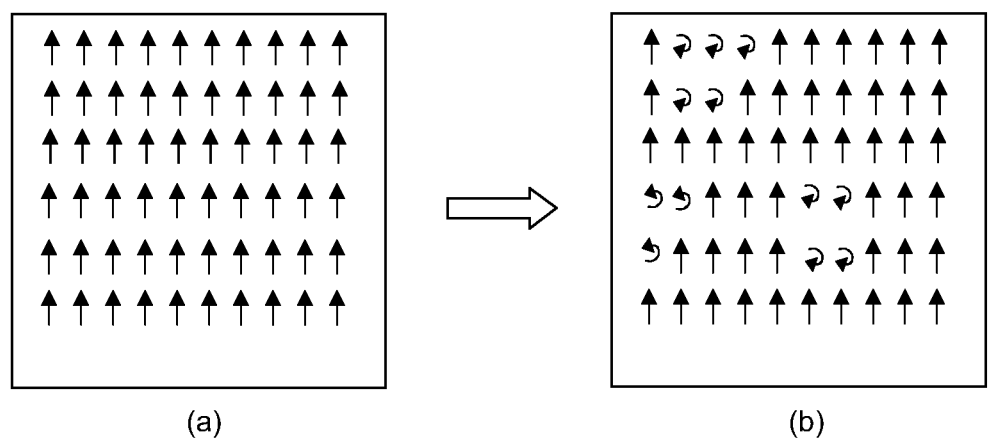
FIG. 2 is a schematic diagram showing the depolarisation effect resulting from birefringence in amplifier gain slabs.

As shown in the example of FIG. 3 the polarisation rotator 120 is preferably arranged such that there are equal number of gain slabs 110 each side of the polarisation rotator. In this arrangement depolarisation resulting from the first group of slabs can be substantially reversed by the second group of slabs. As described below other numbers and arrangements of slabs are possible to achieve the depolarisation effect. As shown in FIG. 3 an input beam or pulse 130 is first incident on the first group of slabs 111. The input beam or pulse is then incident on the polarisation rotator 120. After passing through the polarisation rotator 120 the beam or pulse passes through the second group of slabs 112. The gain slabs when heated can become stressed resulting in stress-induced birefringence. Manufacturing process and mounting can also cause stress-induced birefringence. The input beam or pulses is preferably substantially linearly polarised. The birefringence results in a phase delay or lag between orthogonal components of the electric field of the beam or pulse. In theory if the electric field of the input beam or pulse is aligned with the "e" or "o" (extraordinary or ordinary) axis of the gain slab, then there is no orthogonal component for phase delay. However, in practice this is difficult to achieve, especially with thermally-induced birefringence which is not uniform across the gain slab. Accordingly, a linearly polarised input beam or pulse may have a variation in polarisation such as shown in FIG. 2 after passing through the first group of gain slabs 111.

Polarisation rotator 120 is formed of a material having optical activity (also known as circular birefringence). Optical activity is the property of rotating the plane of polarisation of an input beam. The amount of rotation will depend on the type of material, the thickness of the material and the temperature of operation. Optical activity is found in crystalline quartz and chiral materials such as chiral liquid crystals. Alternatively, a polarisation rotator can also be achieved using a Faraday rotator which is based on the magneto-optic effect.

Waveplates or retarders can also change the polarisation state. For example, a half-wave plate may change the polarisation state of light. The input light may be considered to have orthogonal polarisation states within the plate. The angle of these states relative to the "e" or "o" axes of the waveplate determines the amount of retardation for each and therefore the output polarisation state. In one arrangement, the plate rotates the plane of polarisation of linearly polarised light. The amount of rotation depends on the angle between the electric field vector of the input light and the fast-axis of the birefringent material that the plate is made from. A half-wave plate is therefore of limited use in the present case because it acts on linearly polarised light and requires careful alignment to the correct orientation angle with respect to the plane of polarisation of the input light. A quarter-wave plate is usually used to convert from linearly polarised light to circularly polarised light or vice versa but similar to the half-wave plate requires careful alignment to the correct orientation angle with respect to the plane of polarisation of the input light. Hence, a quarter-wave plate although of possible use requires careful alignment.

Accordingly, the present disclosure relates to the use of a polarisation rotator based on optical activity or Faraday rotation, since these are insensitive to the angle of orientation of the input polarisation.

Figure 4:
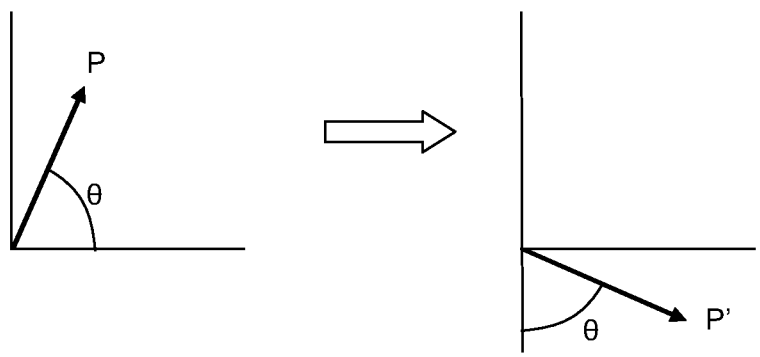
FIG. 4 is schematic diagram of rotation of a linear polarisation.
Figure 5:
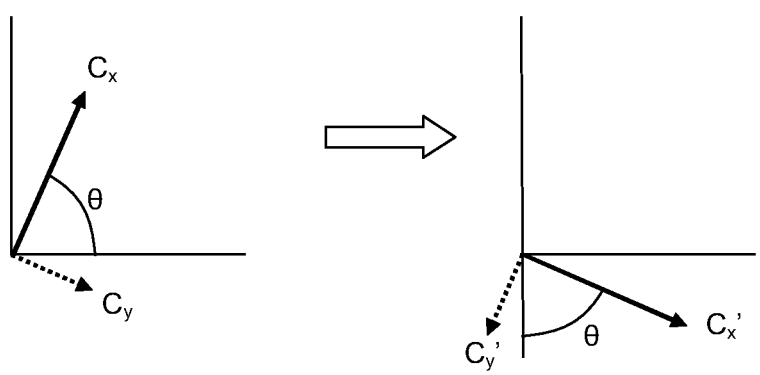
FIG. 5 is schematic diagram of rotation of two linear polarisation or an elliptical polarisation.

In a first preferred embodiment the disclosure uses a 90° polarisation rotator, such as a crystalline quartz rotator. The 90° polarisation rotator is placed in a laser amplifier module between two groups of gain slabs, such as in the arrangement shown in FIG. 3. After passing through the first group of slabs the polarisation state across the beam or pulse may vary as shown in FIG. 2. The 90° polarisation rotator rotates the plane of polarisation by 90°. For example, as shown in FIG. 4 a linear polarisation P is rotated by 90° to the state P'. For elliptically polarised light the light can be conveniently thought of as a combination of two linear polarisations with a phase delay between the electric fields of the two polarisations. When the phase delay is 90° and the amplitudes of the two linear polarisations are equal, the light is circularly polarised. As shown in FIG. 5 the two linear polarisations Cx, Cy making up the circular or elliptical polarisation are rotated 90° to Cx', Cy'. The dotted line represents the part having the phase delay.

Next the beam or pulse passes through the second group of gain slabs 112 shown in FIG. 3. This second group of gain slabs is substantially similar to the first group 111 of gain slabs. For example, as shown in FIG. 3 the number of gain slabs in the second group is preferably equal to the number of gain slabs in the first group. The thickness and material and doping of the gain slabs is also preferably the same. The cooling of each slab and/or more preferably each group of slabs is also preferably the same. As a result, the slabs of the second group exhibit the same birefringence as the first group of slabs. The beam or pulse on passing through the second group of slabs experiences the same birefringent effect as the when passing through the first group of slabs. As mentioned above, birefringence is the effect whereby orthogonal polarisations travel at different speeds through the material resulting in a relative phase delay between the orthogonal polarisations. Thus, the linearly polarised input beam incident on the gain slabs at an angle $\varphi$ to the ordinary axis of the gain material will be subject to a phase delay $\Delta$ between the component of the beam that is polarised parallel to the ordinary axis as compared to the component that is polarised perpendicular to the ordinary axis (and therefore parallel to the extraordinary axis). On arriving at the second group of slabs the polarisation of the beam or pulse has additionally been rotated by 90° so that on passing through the second group of slabs the component of the beam that was polarised parallel to the ordinary axis is now polarised perpendicular to the ordinary axis and parallel to the extraordinary axis. Thus, the component of the linearly polarised input beam that was, on passing through the first group of gain slabs, polarised parallel to the ordinary axis will now be subject to a phase delay $-\Delta$ compared to the component that on passing through the first group of gain slabs was polarised perpendicular to the ordinary axis (and therefore parallel to the extraordinary axis). Accordingly as a result of passing through the first group of gain slabs, the polarisation rotator and the second group of gain slabs the phase delay between orthogonal components of the beam or pulse sums to zero. The actual linear polarisation state is rotated by 90° and substantially any circular or elliptical polarisation resulting from stress-induced birefringence effects in the first group of slabs is compensated for. This assumes the birefringent effect of the first group of gain slabs is the same as the second group of gain slabs. In practice there will likely be some variation between slabs due to slightly different material properties. However, the birefringence including the thermally induced birefringence is expected to be substantially the same between the first group of slabs and the second group of slabs due to their mirror-image configuration. Additionally, any residual mounting stresses will also be largely the same due to the same mounting configurations being used for all of the slabs. Lastly, if the gain slabs are cut from the same growth material then material and processing effects will also be substantially the same. As a result, the birefringent effect of the gain slabs should be substantially eliminated by this approach. The gain slabs may be crystalline, ceramic or amorphous.

The result of the reversal of the phase delay caused by the induced birefringence in the gain slabs is that the beams or pulses output from the laser amplifier are linearly polarised. This means optical components or processing of the beam or pulses after leaving the amplifier module is only required to be able to handle linearly polarized light. In other embodiments, the beams or pulses input to the laser amplifier may be circularly (or even elliptically) polarised. In such cases, the technique described above allows the polarisation state to be substantially preserved by compensating for depolarisation effects.

Figure 6:
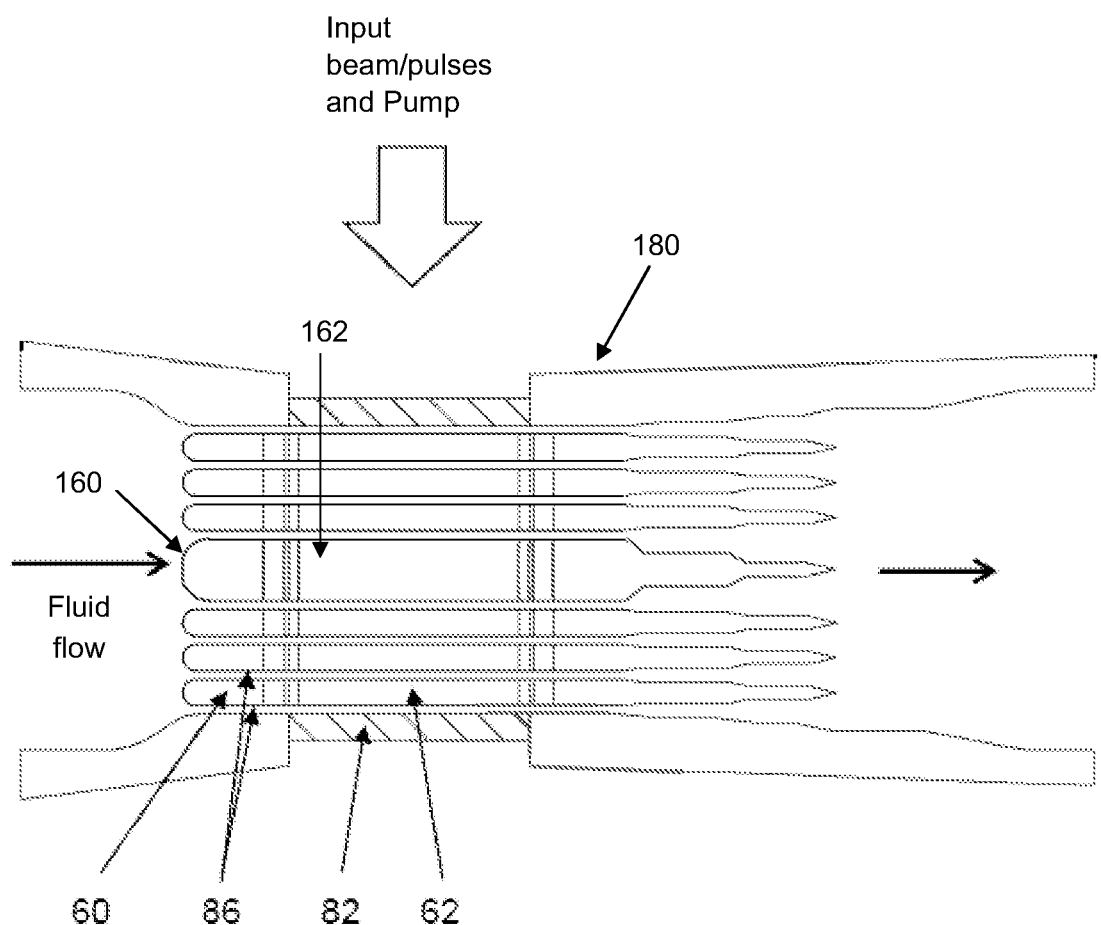
FIG. 6 is a cross-sectional view through a manifold with multiple vane plates and polarisation rotator mounted therein, according to the present invention.

FIG. 6 shows the manifold or casing comprising vane plates shown in FIG. 3 but modified to include an additional vane plate 160 with a polarisation rotator 162 such as a 90° rotator, which may for example be a crystalline quartz rotator. FIG. 6 uses like reference numbers to those in FIG. 1 where no change is required to the component. The manifold 180 shown in FIG. 6 has been modified from that in FIG. 1 to be larger so as to accommodate the additional vane plate 160. The additional vane plate is of similar design to those holding the gain slabs 62. A 90° crystalline quartz rotator may be thicker than gain slabs of, for example, Yb:YAG, and so vane plate 160 and rotator 162 are shown thicker than vane plates 60 and gain slabs 62. The additional vane plate has small gaps between it and the other vane plates in a similar way to FIG. 1 to allow a cooling stream such as a cooling gas to flow through the gaps. The thickness of the gain slabs will depend on the gain material and gain desired. The thickness of the quartz rotator is largely fixed for a specific wavelength and temperature of operation. The refractive index of the rotator may be dependent on temperature, although the temperature dependence is expected to be small. Accordingly, taking into account the change in thickness of a quartz rotator due to thermal expansion it is expected that a quartz rotator will provide the required rotation over a 100K temperature range.

Figure 7:
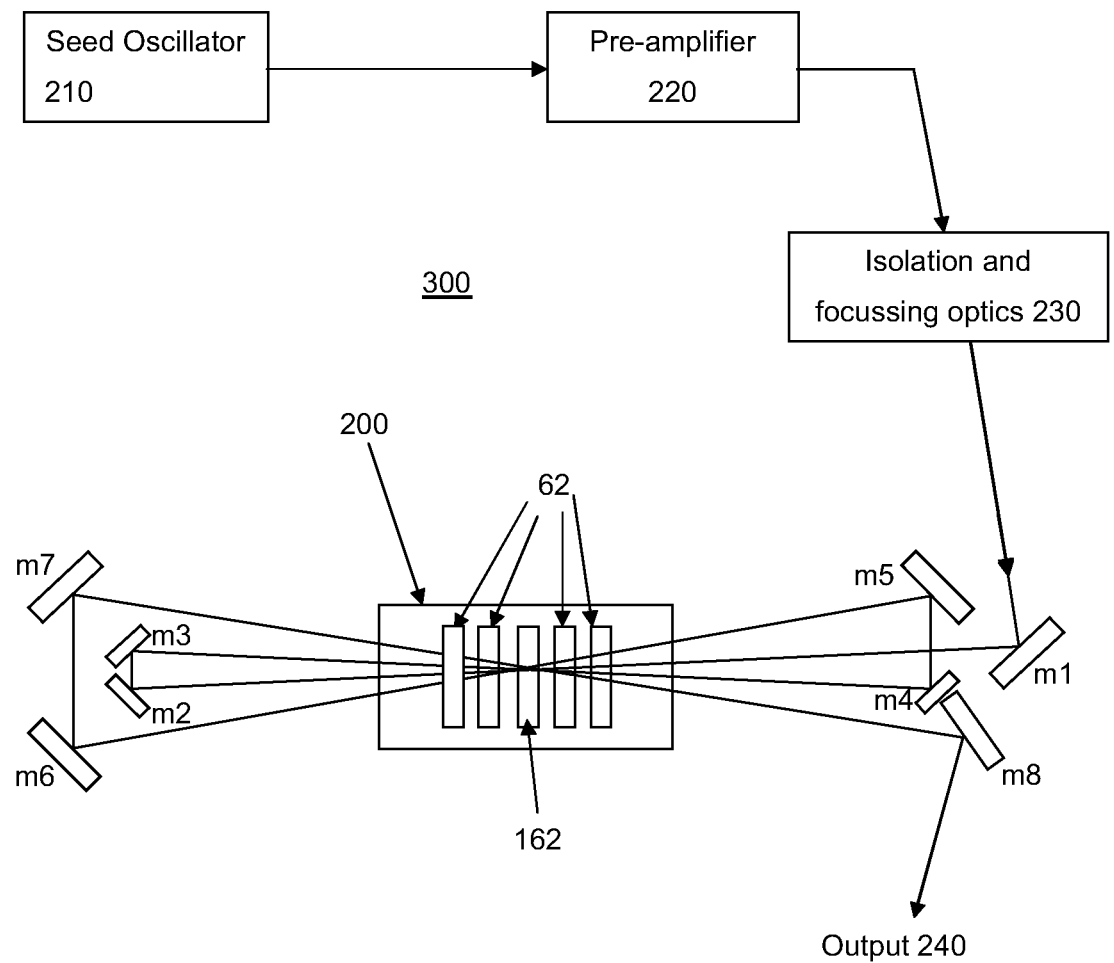
FIG. 7 is a schematic diagram of a laser comprising a laser amplifier module according to the present invention.

In laser systems for high energy, high repetition rate, large area laser pulses multiple amplifiers or multiple passes through a single amplifier head are used to amplify a seed laser up to the required energy level. FIG. 7 shows an embodiment in which the laser amplifier module 200, which is similar to laser amplifier module 100, is implemented in a full laser system 300. The system 300 comprises a seed oscillator 210 which is used as the seed source. The pulses from the seed oscillator 210 may be expanded in area and then amplified by pre-amplifier 220 or a series of pre-amplifiers. The pulses are then transmitted towards the amplifier module 200 via isolation and focussing optics 230. The isolation and focussing optics comprise an optical isolator that prevents back-reflection into the pre-amplifier 220 and seed oscillator 210. The isolator is accompanied by focussing optics to expand the beam before is passes through the isolator and then to further expand the beam before being directed by mirrors to the amplifier module 200.

It should be noted that this disclosure is predominantly directed to a pulsed laser arrangement. Accordingly, the term "beam" is used to mean a series of pulses forming a pulsed laser beam. In certain embodiments a continuous wave beam maybe envisaged.

The beam is directed to the laser amplifier module by mirror m1 for a first pass through amplifier module. Amplifier module comprises four slabs 62 of gain material in two groups of two. Between the two groups of two slabs is provided the polarisation rotator 162. The number of slabs and number of slabs in each group may be different to the four slabs with two in each group, as shown in FIG. 7. For example, six slabs in two groups of three may be provided, as shown in FIGS. 3 and 6. Alternatively, other numbers of slabs may be used.

After passing through amplifier module 200, the beam is incident on a pair of mirrors m2 and m3 which redirect the beam back towards the amplifier module for a second pass. The path of the beam for the second pass is slightly offset from the path of the beam for the first pass. After the second pass the beam is redirected to the amplifier module by mirrors m4 and m5 for a third pass. After the third pass the beam is redirected at the amplifier module by mirrors m6 and m7 for a fourth pass through the amplifier. On exiting the amplifier module for the fourth time the beam is output 240 by mirror m8. In FIG. 7 each pass of the beam through the amplifier module is shown at different angles of incidence. These angles are exaggerated in the figure and would be closer to normal incidence in a real system. The lateral positions of the beams through the amplifier slabs are largely the same for each pass, allowing for slight differences due to the small angle of incidence differences. The cross-sectional beam shape and size is largely the same for each pass through the gain slabs. In some embodiments the beam shape and size, and lateral position through the slabs may differ for each pass. For example, on later passes at higher energies the beam could be expanded to allow more energy to be extracted from the stored energy of the gain slabs. Although FIG. 7 shows four passes through the amplifier module, any number of passes is possible and applicable to the techniques described herein.

The depolarisation compensation is most effective if the position of the beam through the first group of gain slabs is the same as through the second group of gain slabs. This is because although the birefringence of the gain slabs varies across the slabs, it is substantially the same from one slab to the next. We can make this assertion because CFD modelling has been used to design the amplifier module so that flow and cooling in each channel between vane plates is very similar. Furthermore, flow conditioning upstream of the amplifier module can be used to further make uniform the flow and cooling for each slab. Accordingly, because of the variation in birefringence across the slabs it is desirable to avoid large angular deviations from normal incidence so that the beam position passing through each slab is approximately the same. Indeed, it may be preferable to use a normal incidence configuration. However, different lateral position or different beam size or shape from one pass to the next will not substantially affect the depolarisation compensation.

Figure 8:
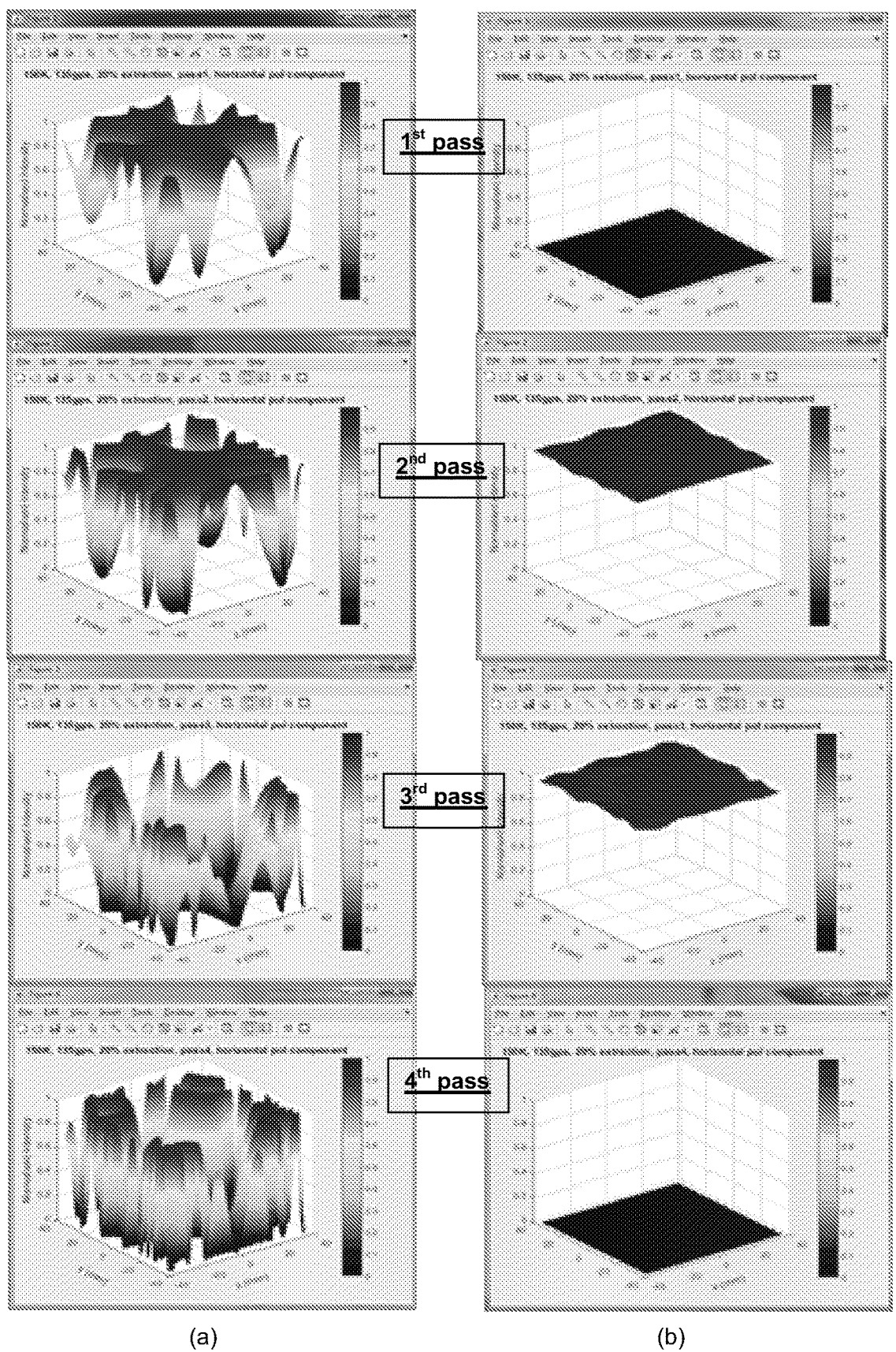
FIG. 8 are graphs showing the simulated result of depolarisation for multiple passes through a prior art amplifier module and compared to an amplifier module according to the present invention.
Figure 9:
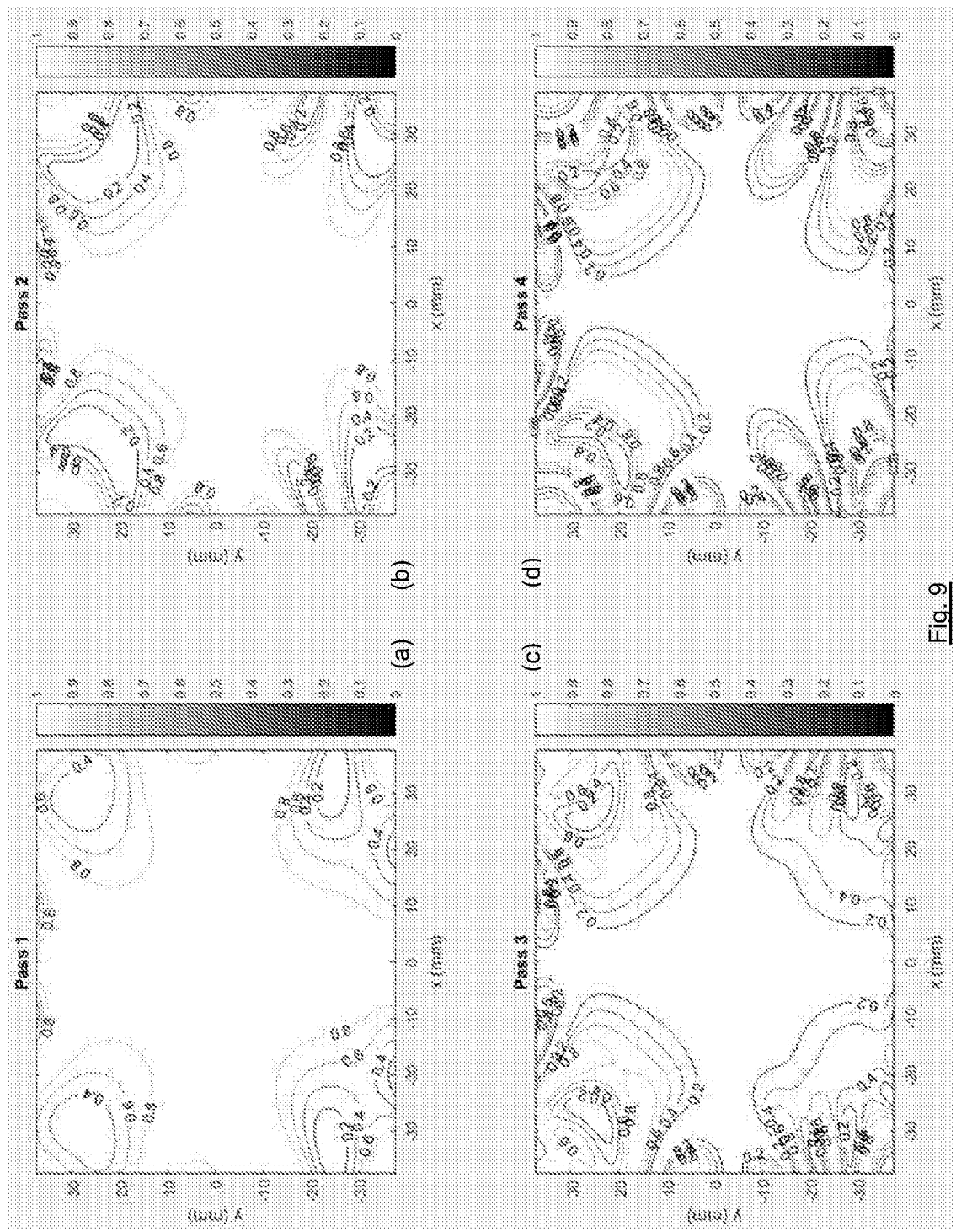
FIG. 9 are contour plots of the graphs of FIG. 8 showing the simulated result of depolarisation for multiple passes through a prior art amplifier module.
Figure 10:
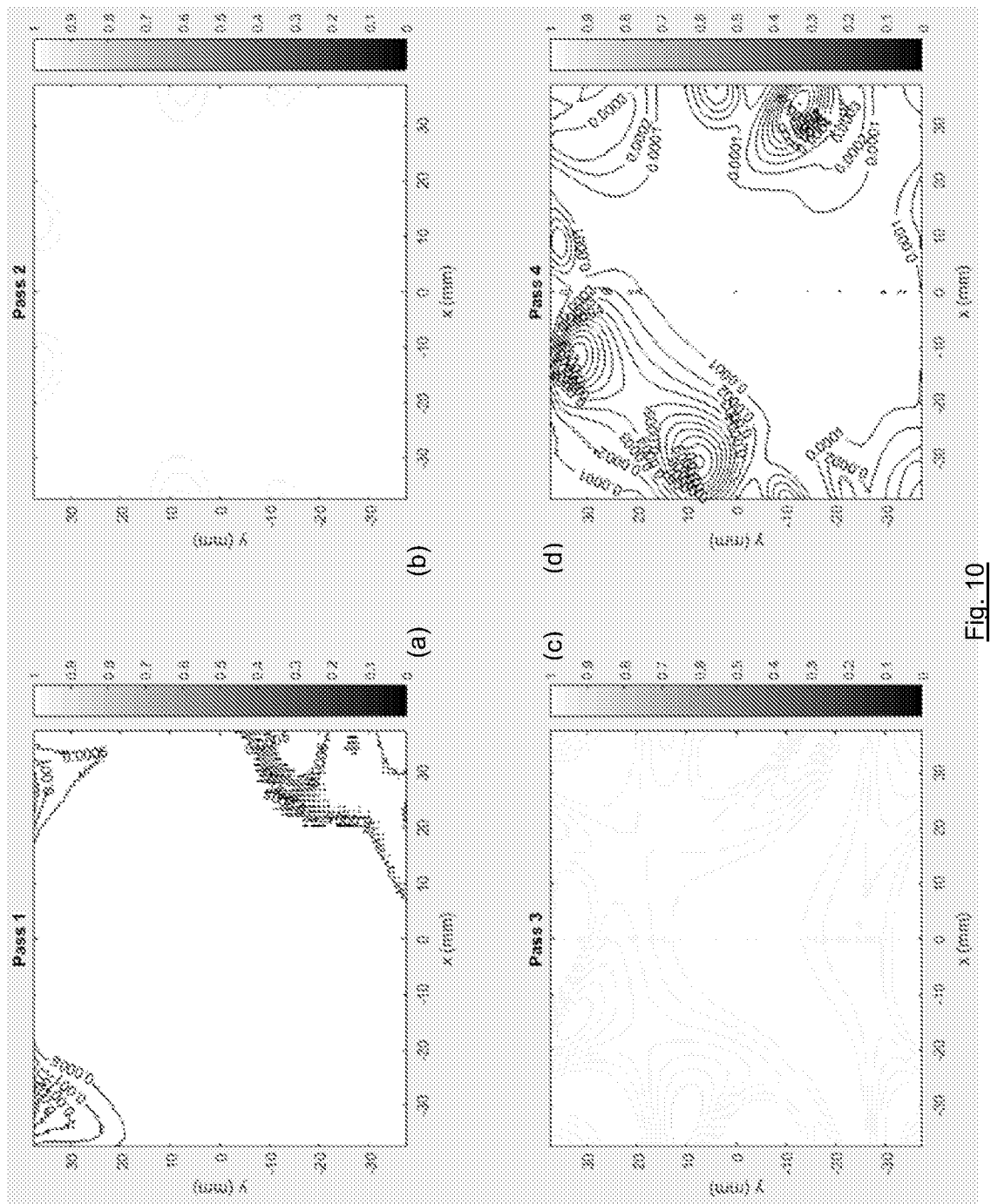
FIG. 10 are contour plots of the graphs of FIG. 8 showing the simulated result of depolarisation for multiple passes through an amplifier module according to the present invention.

FIGS. 8-10 show simulated results of the effect of the depolarisation compensation. Eight graphs are shown in FIG. 8. Each graph has x and y axis in mm relating to lateral position across the beam. The vertical axis (ordinate) shows normalised intensity after passing through a polariser to convert depolarisation into a measurable quantity. The four graphs on the left (a) in FIG. 8 represent the depolarisation effect for each of four passes through the amplifier module when no polarisation rotator is included, as for the conventional case. The four graphs on the right (b) in FIG. 8 represent the depolarisation effect for each of four passes with the polarisation rotator in position. FIG. 9 shows the results of FIG. 8(a) as contour plots of the depolarisation for each pass. FIG. 10 shows the results of FIG. 8(b) as contour plots of the depolarisation for each pass. The results are for an amplifier module having six gain slabs, that is, two groups of three slabs for the depolarisation compensated version. Other aspects used for the simulation are that the active region of the gain slabs is ceramic Yb:YAG material, which is surrounded by an absorbing cladding made of ceramic Cr:YAG. The slabs are 120 mm×120 mm, of which the inner Yb:YAG active area is 100 mm×100 mm in size, surrounded on all sides by a 1 cm wide Cr:YAG cladding. The pump beam is square having a size 78 mm×78 mm. The seed beam is also square at 75 mm×75 mm. The wavelength of the pump beam is 940 nm, and that of the seed beam is 1030 nm. An operating temperature of the amplifier module is set as 150 K, which is achieved using a cooling stream at a gas pressure of 10 bar. The pulse repetition rate is 10 Hz. The pump pulse duration is 1 ms. The output seed pulse energy is 100 J and the pump pulse energy is 500 J. The pulses pass through the amplifier module four times. The polarisation rotator is 100 mm×100 mm square. The polarisation rotator is crystalline quartz and provides 90° of rotation. The amplifier module is cooled to the 150K with coolant gas flowing at 135 grams per second. The top graphs in FIG. 8 show the intensity of the horizontal polarisation component. As can be seen in the left hand graph, which is for the conventional case without the polarisation rotator, there is significant intensity variation across the beam. In the right hand graph there is no discernible variation in intensity. Note that the polarisation rotator has rotated the plane of polarisation by 90° for the right hand figure so that the plane of polarisation of the beam is perpendicular to the polariser. This results in the intensity being shown as zero. The polariser is used for analysis so that the polarisation variation can be seen. In a real system the polariser is not always necessary but could be included to enhance extinction ratio. Hence, for a single pass through the amplifier module the polarisation rotator provides a significant improvement in polarisation uniformity across the beam. This is also seen for the second and subsequent passes. By the third and fourth passes the graphs on the left show a larger variation in polarisation which would result in significant energy loss in a real system. The graph for the second pass on the right shows a small variation in polarisation. Note that the quartz rotator has rotated the plane of polarisation of the beam such that it is now aligned parallel to the polariser, such that the normalised intensity is seen as approximately one. Even after the fourth pass there is little variation in intensity across the beam. This shows that even after multiple passes the quartz rotator compensates for the depolarisation by the birefringence of the gain slabs. Note that the polarisation state after the second pass is that same as that after the third pass even though the beam or pulses has passed through a polarisation rotator as in the other passes. The lack of a change in the polarisation state between second and third passes is because in the amplifier design according to an embodiment of this disclosure there is a periscope between the second and third pass. This introduces a 90 degree rotation of the plane of polarisation. A design without the periscope would not exhibit this effect.

As shown in FIGS. 3 and 6, and also present in the embodiment of FIG. 7 (not shown) the optical amplifier includes optical windows. The windows allow the pump beam and laser pulses to propagate into the amplifier module but contain the pressurised coolant stream within the amplifier module. The windows are preferably sapphire due to their high transmittance, and mechanical strength. The thermal stability of sapphire is also important as the windows are only cooled on one side and will likely heat up. Sapphire is normally birefringent. The sapphire for the windows is z-cut with the extraordinary axis aligned perpendicular to the window flat surface. This means that for beam or pulses incident normal to the window surface no birefringent effect occurs on the beam or pulses. However, as described above when an amplifier module is used with multiple passes, angular multiplexing may be used to propagate the various passes through the amplifier. This results in the beams or pulses being slightly non-normal at incidence to the window surface. A small birefringent effect is therefore present. In the embodiments described herein with the polarisation rotator placed in between the gain slabs, the birefringent effect of the windows is also substantially eliminated in the same way as for the birefringent effect from the gain slabs. In an alternative arrangement whereby two conventional amplifier modules without polarisation rotator such as shown in FIG. 1, are arranged in series with a polarisation rotator between the modules, the birefringence of the windows is not compensated. This is because the angle of incidence at the windows of the two modules will likely be slightly different. As such the birefringent effect of the windows of the first amplifier is slightly different to that for the second amplifier and therefor some depolarisation will not be fully compensated. In the amplifier module of the present invention the angular relation between the beams and windows is fixed by being mounted in the amplifier modules so the birefringent effect of the windows will be the same.

In an alternative arrangement the windows may be made of other materials, such as fused silica. The fused silica should be silica with a low OH content to minimise absorption (of energy from the seed or pump beam or pulses) which is the main cause of heating in fused silica at infrared wavelengths around 1 micron.

The above description of FIG. 7 relates to a beam or pulses passing through a single amplifier module multiple times. Each pass is in the opposite direction to the first, providing a to-and-fro or there-and-back arrangement. Other configurations are possible. For example, another configuration for the multiple passes through a single amplifier arrangement is to use a cyclic arrangement. In a cyclic arrangement each pass through the amplifier module would be in the same direction. Spatial constraints would again mean that the beams would likely pass through the gains slabs and polarisation at a small angle to normal.

Figure 11:
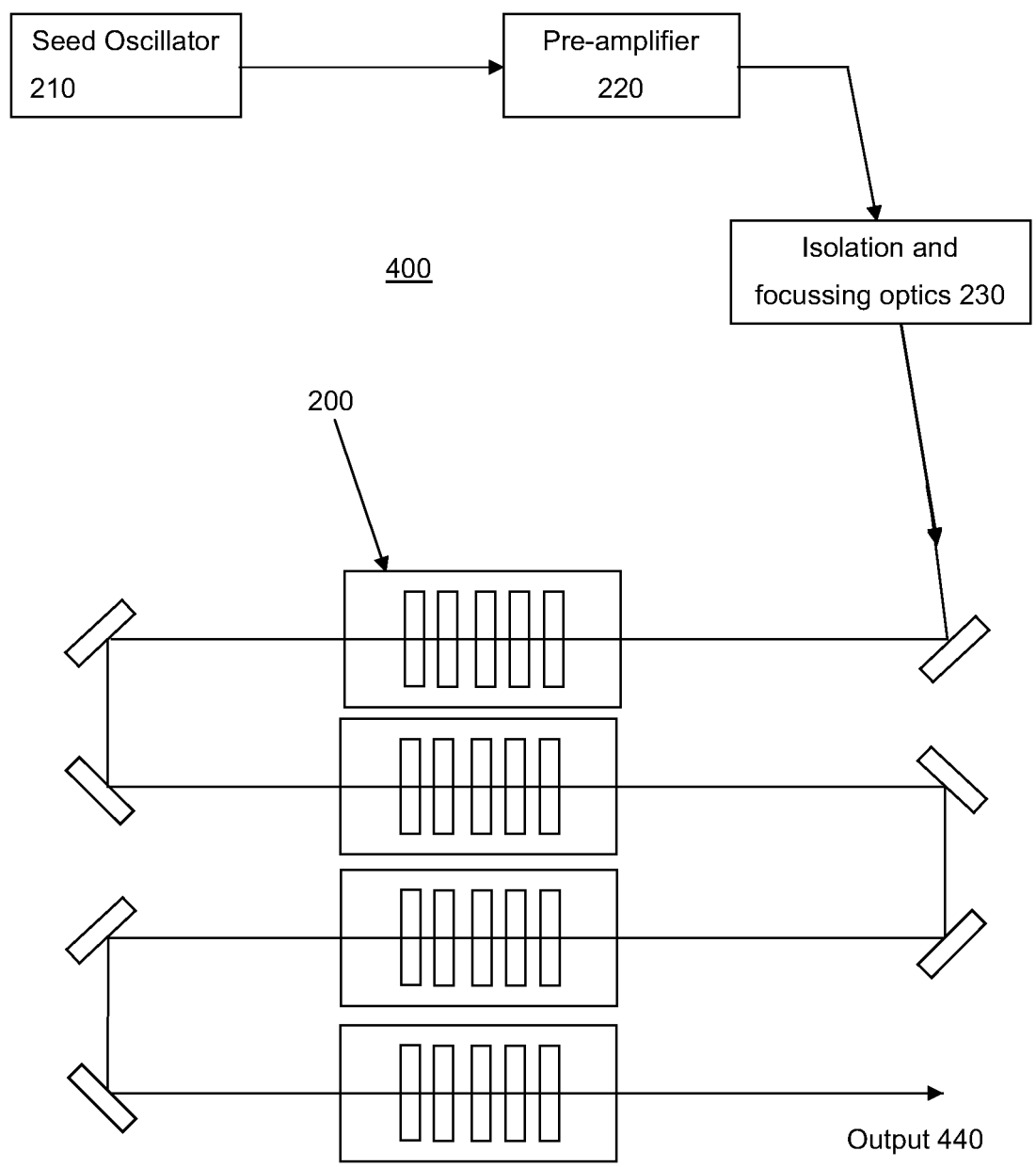
FIG. 11 is schematic diagram of a laser comprising multiple laser amplifier modules according to an alternative arrangement of the present invention.

In an alternative arrangement 400 instead of multiple passes through a single amplifier module as described above in relation to FIG. 7, multiple amplifier modules may be provided in series as shown in FIG. 11. In the example in FIG. 11 four amplifier modules are provided, but other numbers of amplifier modules are possible. The beam or pulses are arranged to pass through each amplifier module once, passing through each amplifier module in turn. Pairs of mirrors are provided between amplifier modules to direct the beam to the next amplifier module. After the fourth amplifier module the beam is output at 440. Each amplifier module would be similar to those 100, 200 described in FIGS. 3 and 7. The amplifier module would comprise a polarisation rotator. Again each pass through the amplifier module is self-compensating such that the depolarisation effects are substantially eliminated. The four amplifier modules could be cooled by the same fluid stream passing through first, second third and fourth amplifier modules in turn. In the diagram of FIG. 11 the direction of fluid flow would be in the vertical direction. The depolarisation compensation results would be largely as shown in FIGS. 8-10.

In a further alternative arrangement the polarisation rotator may be a Faraday rotator. A Faraday rotator is based on the magneto-optic effect and requires a magnetic field to be present in the material. The magnetic field may be provided by permanent magnets placed around the material. The material may be terbium gallium garnet, although alternatives are possible such as terbium doped borosilicate glass. The requirement for permanent magnets means that a Faraday rotator will likely take up more space in the amplifier module than a quartz rotator or other rotator based on optical activity. A Faraday rotator is different to a rotator based on optical activity in that a Faraday rotator is non-reciprocal. In comparison a polarisation rotator based on optical activity will rotate the plane of polarisation, by for example 90° clockwise when the beam passes forwards and 90° anti-clockwise when the beam passes backwards through the rotator. A Faraday rotator's non-reciprocal nature means that on a forward pass the beam might be rotated 90° clockwise whereas on a backwards pass it might rotate the polarisation a further 90° clockwise.

The above described embodiments describe that in the amplifier module there are an equal number of gain slabs in the group of slabs one side of the polarisation rotator as compared to the group of slabs the other side of the polarisation rotator. This is because the second group of gain slabs is required to have as similar as possible a birefringent effect on the beam or pulses as the first group of gain slabs, so as to compensate for the depolarisation effect as fully as possible. In other arrangements it is possible that to as fully as possible compensate for the effect of birefringence in the gain slabs it may be preferable to have the polarisation rotator arranged at a position other than having equal numbers of gain slabs either side of the rotator. This could be because the gain slabs on one side of the rotator are providing a greater birefringent effect than the other side. For example, one arrangement in which this would occur is an amplifier module in which the first group of slabs is heated more than the other due to providing greater gain because of stronger pumping. One arrangement in which it might be desirable to pump one side more than the other is because the cooling is stronger one side than the other. Another possibility is that the gain slabs on one side are thicker and are pumped more than the gain slabs on the other side. Accordingly, the polarisation rotator may be offset from the middle position in the manifold and located at the position which best equalises the birefringent effect of the two groups of gain slabs. For example, in six slab amplifier module the polarisation rotator may be placed with two slabs one side and four slabs the other side. In another arrangement the number of slabs may not be an equal number but may for example be five or seven. In such a case the polarisation rotator may be arranged such that the number of slabs each side differs by one. Other variations in the number of gain slabs and positioning are possible.

Detailed Embodiment

The description above provides information relating to a simulated system on which the results of FIGS. 8-10 have been obtained. This simulated system is based on an actual laser system having, as set out above, a seed wavelength of 1030 nm and a pump wavelength of 940 nm. Other aspects are set out as above. The output seed energy may be 105 J with a pump energy of 456 J. The pulse repetition rate may be 10 Hz. The temperature of operation of the gain media slabs is cooled to 150 K.

The person skilled in the art will readily appreciate that various modifications and alterations may be made to the above described laser amplifier module without departing from the scope of the appended claims. For example, different shapes, dimensions and materials may be used.

The invention claimed is:

1. A self-compensating fluid-cooled laser amplifier module, the laser amplifier module compensating for depolarisation induced therein, the laser amplifier module comprising:
   a casing;
   a plurality of slabs of optical gain medium oriented in parallel in the casing for cooling by a fluid stream;
   a polarisation rotator mounted in the casing for cooling by the stream, the polarisation rotator disposed between a first group of one or more slabs of the plurality of slabs of optical gain medium and a second group of one or more slabs of the plurality of slabs of optical gain medium,
   the casing comprising:
      optical windows for receiving an input beam or pulse for amplifying by the slabs and for outputting the amplified beam or pulse; and
      fluid stream ports for receiving and discharging the fluid stream for cooling the slabs and the polarisation rotator, and
   wherein the polarisation rotator is arranged in the casing between the first group of one or more slabs and the second group of one or more slabs such that the second group of slabs compensates for depolarisation resulting from the first group of slabs thereby providing self-compensation of depolarisation induced in the module.

2. The fluid-cooled laser amplifier module of claim 1, wherein the fluid stream ports are arranged parallel to the plane of the slabs such the fluid stream is oriented to flow between the slabs.

3. The fluid-cooled laser amplifier module of claim 1, wherein the fluid for cooling is a gas.

4. The fluid-cooled laser amplifier module of claim 1, wherein the polarization rotator is arranged to transpose orthogonal polarisation components of an input beam or pulse that has passed through the first groups of slabs, the transposition such that relative retardance between the orthogonal polarisations is substantially removed by passing through the second group of slabs.

5. The fluid-cooled laser amplifier module of claim 1, wherein the polarisation rotator provides a substantially 90 degree rotation in the polarisation of the input beam or pulse.

6. The fluid-cooled laser amplifier module of claim 1, wherein the polarisation rotator comprises one or more polarisation rotation components, the combined polarisation rotation of the polarisation rotation components being substantially 90 degrees.

7. The fluid-cooled laser amplifier module of claim 1, wherein the polarisation rotator comprises a material having optical activity to produce the polarisation rotation.

8. The fluid-cooled laser amplifier module of claim 7, wherein the polarisation rotator is crystalline quartz.

9. The fluid-cooled laser amplifier module of claim 1, wherein the polarisation rotator is a Faraday rotator.

10. The fluid-cooled laser amplifier module of claim 1, wherein each of the slabs of optical gain medium is mounted in a corresponding vane plate arranged for cooling by the fluid stream, and the polarisation rotator is mounted in a further vane plate for cooling by the fluid stream.

11. The fluid-cooled laser amplifier module of claim 1, wherein the polarisation rotator is oriented parallel to the slabs.

12. The fluid-cooled laser amplifier module of claim 1, wherein between adjacent slabs are channels arranged for flowing the cooling stream through for cooling the slabs.

13. The fluid-cooled laser amplifier module of claim 1, wherein the first group of slabs and second group of slabs comprise the same gain material and at least one of:
the same number of slabs;
the same total thickness of gain material;
the same amount of gain,
such that the first and second groups of gain slabs have substantially equal birefringence.

14. The laser amplifier module of claim 1, wherein the polarisation rotator is placed in the middle of the gain slabs such that there are equal numbers of gain slabs in the module in the optical path before and after the polarisation rotator.

15. A laser comprising a self-compensating fluid-cooled laser amplifier module, the laser amplifier module compensating for depolarisation induced therein,
the self-compensating fluid-cooled laser amplifier comprising:
a casing;
a plurality of slabs of optical gain medium oriented in parallel in the casing for cooling by a fluid stream;
a polarisation rotator mounted in the casing for cooling by the fluid stream, the polarisation rotator disposed between a first group of one or more slabs of the plurality of slabs of optical gain medium and a second group of one or more slabs of the plurality of slabs of optical gain medium,
the casing comprising:
optical windows for receiving an input beam or pulse for amplifying by the slabs and for outputting the amplified beam or pulse; and
fluid stream ports for receiving and discharging the fluid stream for cooling the slabs and the polarisation rotator, and
wherein the polarisation rotator is arranged in the casing between the first group of one or more slabs and the second group of one or more slabs such that the second group of slabs compensates for depolarisation resulting from the first group of slabs thereby providing self-compensation of depolarisation induced in the module, the laser further comprising:
a seed oscillator for generating seed laser pulses; and
optical components to couple the seed pulses to the self-compensating fluid-cooled laser amplifier module.

16. The laser of claim 15 further comprising one or more pre-amplifiers for amplifying the seed pulses before transmission to the fluid-cooled laser amplifier module.

17. The laser of claim 15, comprising further optical components to direct the pulses for multiple passes through the fluid-cooled laser amplifier module.

18. The laser of claim 15, comprising a plurality of said fluid-cooled laser amplifier modules and further optical components to direct the pulses from one amplifier module to the next.

19. A method of depolarisation self-compensation in a fluid-cooled laser amplifier module, the method compensating for depolarisation in the laser amplifier module, the method comprising:
arranging a plurality of slabs of optical gain medium in a casing for cooling by a fluid stream, the casing having optical windows and fluid stream entry ports;
arranging a polarisation rotator in the casing for cooling by the fluid stream, the polarisation rotator disposed in an optical path between a first group of one or more slabs of the plurality of slabs of optical gain medium and a second group of one or more slabs of the plurality of slabs of optical gain medium;
cooling the plurality of slabs and the polarisation rotator by the fluid stream received and discharged at the fluid stream ports; and
directing an input pulse or beam through an input window at the first group of one or more slabs of the plurality of slabs of optical gain medium and to subsequently pass through the polarisation rotator and the second group of slabs of one or more slabs of the plurality of slabs of optical gain medium and exit from an output window,
wherein the polarization rotator is arranged in the casing between the first group of one or more slabs and the second group of one or more slabs such that the second group of slabs compensates for depolarisation resulting from the first group of slabs thereby providing self-compensation of depolarisation induced in the module.

20. The method of claim 19, wherein the polarization rotator rotates the polarization of the input beam or pulse that has passed through the first group of slabs to transpose orthogonal polarisation components of the input beam or pulse, the transposition such that relative retardance between the orthogonal polarisations is substantially removed by passing through the second group of slabs.

21. The method of claim 19, wherein the polarisation rotator provides a substantially 90 degree rotation in the polarisation of the input beam or pulse.

22. The method of claim 19, wherein the polarisation rotator comprises one or more polarisation rotation components, the combined polarisation rotation of the polarisation rotation components being substantially 90 degrees.

23. The method of claim 19, wherein the polarisation rotator comprises a material having optical activity to produce the polarisation rotation.

24. The method of claim 19, wherein the polarisation rotator is crystalline quartz.

25. The method of claim 19, wherein the polarisation rotator is a Faraday rotator.

26. The method of claim 19, wherein each of the slabs of optical gain medium is mounted in a corresponding vane plate arranged for cooling by the fluid stream, and the polarisation rotator is mounted in a further vane plate for cooling by the fluid stream.

27. The method of claim 19, wherein the fluid for cooling is a gas.

28. The method of claim 19, further comprising arranging the polarisation rotator in the middle of the gain slabs such that there are equal numbers of gain slabs in the module in the optical path before and after the polarisation rotator.

* * * * *